United States Patent [19]

Hornok et al.

[11] 4,426,763

[45] Jan. 24, 1984

[54] TOOL CHANGER

[75] Inventors: Emery Hornok, Natrona Heights; Gary L. Killian, Pittsburgh, both of Pa.

[73] Assignee: Aerotech, Incorporated, Pittsburgh, Pa.

[21] Appl. No.: 297,333

[22] Filed: Aug. 28, 1981

[51] Int. Cl.³ .................... B23Q 3/157; G05B 19/27
[52] U.S. Cl. ...................................... 29/568; 211/1.5; 318/602
[58] Field of Search ....................... 29/568, 563, 33 D; 211/1.5; 318/602; 408/35

[56] References Cited

U.S. PATENT DOCUMENTS

| | | | |
|---|---|---|---|
| 3,355,798 | 12/1967 | Drechsler | 29/568 |
| 3,431,635 | 3/1969 | Balding | 29/568 |
| 3,744,124 | 7/1973 | Gardner | 29/568 |
| 4,109,188 | 8/1978 | Shima et al. | 29/568 X |
| 4,372,728 | 2/1983 | Murakami | 29/568 X |

Primary Examiner—Z. R. Bilinsky
Attorney, Agent, or Firm—Webb, Burden, Robinson & Webb

[57] ABSTRACT

A tool changer for a milling machine comprising a tool store, twin claw tool changer and microprocessor controller. Tool hangers in the tool store are mounted to an orbiting chain. The chain is driven by a servomotor to advance a tool hanger to the ready (exchange) position through the shortest distance without each tool hanger coming to rest as it passes the ready position. The tool exchange takes place with no movement of the orbiting chain after the tool exchange is initiated since the tool holder removed from the spindle of the milling machine is placed into the very same hanger from which the tool holder placed in the spindle was taken. The microprocessor keeps track of which tool holders are in which hanger no matter how many exchanges.

18 Claims, 14 Drawing Figures

TOOL CHANGER

BACKGROUND

A tool changer according to this invention is structured to be secured to existing vertical milling machines. Vertical milling machines have a horizontal table upon which the workpiece is fastened. The table may be automatically adjusted in two horizontal directions simultaneously. The directions of movement are often referred to as the x and y axes. The milling machine has a spindle into which tool holders may be secured. (As is well known to machinists, tools such as drills, routers, and the like are integrally secured to the tool holders. Thus changing tool holders means changing tools.) The spindle is driven in rotation to turn the tool holder and to cut the workpiece. The spindle is vertically adjustable from an upwardmost position to enable the tool to engage the workpiece. The direction of spindle movement is often referred to as the z axis. The upwardmost position of the spindle is the position in which the tool holder can be secured or released in the spindle. Thus, the upwardmost position of the spindle is referred to as the tool change position.

Spindles and tool holders are standardized throughout the industry. The tool changer specifically described herein is useful with type 30 and type 40 tool holders. These have an upper cylindrical shank with a threaded bore therein. A drawbar (part of the spindle) turns into the threaded bore to draw a conical portion of the tool holder into a conical seat in the spindle. The tool holder must be held up into the spindle for the drawbar to engage it. The tool holder must also be supported when the drawbar releases it. Because, the tool holder is not supported against rotation when being secured or released, the drawbar is typically driven by an impact wrench. What has been described so far with regard to tool holders and milling machines is part of the prior art with which the tool changer according to this invention may be associated.

Machining centers are systems for machining a workpiece requiring, at most, the manual placement of the workpiece upon the machine and the manual removal of the workpiece upon completion. All tool selection, workpiece positioning, and spindle speed adjustments are made automatically either under a punched tape numerical control or a more modern computer numerical control (CNC). Some machining centers are designed from ground up. However, there exists a large capital investment in manually operated or simple numerical controlled milling machines with manual tool changing. Many of these existing milling machines can be upgraded to machining center capability by the further addition of a tool changer. The tool designs that have been proposed, and in some cases actually commercialized, have had drawbacks. Prior add-on tool changers are illustrated, for example, in U.S. Pat. Nos. 3,949,462; 3,951,273; 3,955,267; and 3,872,743. For a tool changer designed to be added to existing milling machines to be practical, it must be simple, rugged, reliable, fast and have a minimum of expensive parts. Moreover, since there are a large number of models of milling machines each having a different configuration available for retrofitting, a tool changer must be easily adapted to each without redesign of complicated parts. Most important, the tool changer must not reduce the capabilities of the milling machine upon which it is mounted by physically interfering with the existing motion.

It is an advantage according to this invention to provide a tool changer adaptable to existing milling machines to upgrade them to machining center capability.

It is an advantage according to this invention to provide a tool changer easily adaptable to a large variety of milling machines by the simple substitution of brackets between the milling machine and the tool changer and/or brackets between the tool store and the tool changing arm.

It is an advantage according to this invention to reduce the complexity of the tool changing and storing mechanism by making unique use of microprocessor technology.

It is an advantage according to this invention to facilitate integration with existing numerical and computer numerical control systems by making unique use of microprocessor technology to enable all tool changer functions including spindle, brake and drawbar functions to issue in reponse to a single command from the numerical control.

It is an advantage according to this invention to provide for rapid tool changing by unique use of microprocessor technology to eliminate or substantially entirely eliminate waiting for tool holders within the tool store to be presented to the tool changing arm.

It is an advantage according to this invention that the next tool holder needed can be advanced to the ready position while the preceding tool is being used and no movement of hangers within the tool store is required thereafter until exchange of tool holders is complete.

It is a further advantage that tool hangers within the tool store can be moved by a substantially continuous motion through the shortest distance by the unique use of servodrive technology. There is no need for each tool holder to come to rest as it passes the ready position. It permits the tool hangers to be located precisely at the ready position without the need to activate additional yoke, pin or stop mechanisms.

It is a further advantage that under most modes of operation, there exists no need to drive the tool carousel and twin claw exchange are simultaneously thus eliminating the potential for clashing.

It is a further advantage according to this invention that the tool holders always remain tool down, whether in the spindle, in the tool store or therebetween, thus improving cleanliness of the tools and eliminating the need for wrist action in the twin claw transfer arm.

It is a further advantage according to this invention to provide a mechanism for engaging the tool holders in the tool store hangers which requires only a small modification of existing tool holders in a location that in no way interferes with the functioning of the tool holder when in the spindle.

SUMMARY OF THE INVENTION

A tool changer according to this invention cofunctions with a typical vertical milling machine or the like having an x-y position table to which the workpiece is secured for horizontal motion in any direction and a z axis spindle movable in the vertical direction. At its uppermost position, the spindle can automatically secure or release a tool holder.

The tool changer comprises a tool store, twin claw transfer arm and microprocessor controller with a program stored in read-only memory. The tool store comprises a horizontal frame that is arranged to be secured to the frame of the milling machine. The horizontal frame supports the sprockets for an orbiting continuous chain. Tool hangers for receiving and releasably holding tool holders are equally spaced around the chain. The chain and tool hangers comprise a tool carousel. One location along the orbiting chain is a ready (exchange) position at which tool holders can be released from tool hangers. An air actuated piston at the ready position, when energized, acts upon the hanger at the ready position to release the tool holder from the hanger or to ready the tool hanger to receive a tool holder. The orbiting chain is driven by a servomotor and is driven to move a desired hanger to the ready position without bringing each intermediate tool hanger to rest as it passes the ready position. Each hanger has a release mechanism associated therewith such as a quick disconnect type collar, which when moved relative to the hanger by the air piston, allows the tool holder therein to drop from the hanger.

Secured to the tool store is the twin claw transfer arm. The transfer arm is attached to the bottom of a slide tube or the like that may be raised and lowered along its axis within limits, say four inches, and may be rotated about it axis 180 degrees. Air actuated pistons move the slide tube in its vertical travel. The slide tube is mounted such that it is preferably located at the bisector of a line between the axis of a tool hanger at the ready station and the axis of the spindle. It must be on the line between the axes just mentioned. The twin claw arm has two claws arranged to slide radially away from and back toward the axis of the slide tube moving in opposite directions at all times. Each claw has two springs loaded fingers which ride into engagement with a tool holder securing it from vertical movement. Air actuate pistons move the claws in and out, say, three inches.

The slide tube is slidably secured within a rotating drive tube which is journaled for rotation of 180 degrees between the stops. The rotating drive tube has a driven sprocket fixed thereto. A motor, which can be selectably driven either clockwise or counterclockwise is mounted to the tool store and has a drive sprocket extending therefrom. A chain wraps the drive sprocket on the motor and the driven sprocket on the rotating tube to cause the tube to turn either clockwise or counterclockwise through 180 degrees.

It is a preferred feature of this invention that the rotating tube is journaled within a guide tube that has two axial guideways on opposite sides and a semicircular guideway joining the lower ends of the two axial guideways. It is further preferred that the slide tube has a guide pin that extends through a slot in the rotating tube and rides in said guideway in the guide tube thus guiding the up-down motion of the slide tube and permitting only 180 degrees of rotation.

A plurality of limit switches are provided for acknowledging the location of certain elements, for example, when the rotating tube is in either extreme angular position, when the twin claw arm is in the down or rotate position or when the twin claw arm is in the up or spindle position.

The microprocessor controller has a procedure stored in read-only memory for controlling the exchange of tools between the spindle and tool holder in the hanger at the ready position. It also has a procedure stored in read-only memory to bring the next desired tool holder to the ready position. The controller may be prgrammed to receive manual instruction through a keypad associated therewith or automatic instructions issued, for example, from a CNC (computer numerical controller). It is preferred that the controller have a stored procedure for returning a tool in the spindle to an empty tool hanger and a stored procedure initializing the tool carousel, i.e., identifying the initial relationship between unique tools and the tool hangers in which they are placed.

The stored procedure for bringing the correct tool to the ready position comprises: finding the present position of the tool holder by reference to a look-up table in scratch pad memory; calculating the shortest route (distance and direction) and then positioning the correct tool to the ready position.

The stored procedure for exchanging tools comprises: issuing a command to turn off the spindle, following by a procedure to bring the correct tool hanger to the ready position (if already correct this procedure takes only an instant); ascertaining that the spindle is in its upwardmost or tool changing position by monitoring an input signal indicative thereof; issuing a command to expand the claws so that one engages the tool in the spindle and the other engages the tool holder at the ready position on the carousel; issuing the commands to release the tool holder from the spindle and tool holder from the hanger at the ready position; issuing the commands while monitoring the position feedbacks to lower the twin claw arm, retract the claws, rotate 180 degrees, expand the claws and raise the twin claw arm to present the tool holders in the claws to the spindle and hanger; issuing commands to secure the exchanged tool holders in the spindle and hanger; issuing a command to retract the claw arms; issuing commands to turn on the spindle; and issuing acknowledgement signals indicating that tool exchange is completed and finally updating the look-up table.

DESCRIPTION OF THE PREFERRED EMBODIMENT

The tool changer according to this invention comprises three subassemblies; namely, a tool store, a twin claw tool changing mechanism and a microprocessor controller with a controlled procedure stored in read-only memory. The tool store and twin claw mechanism are mounted by brackets to the milling machine. The brackets are specifically sized to adapt the tool changer to the particular milling machine.

Figure 1:
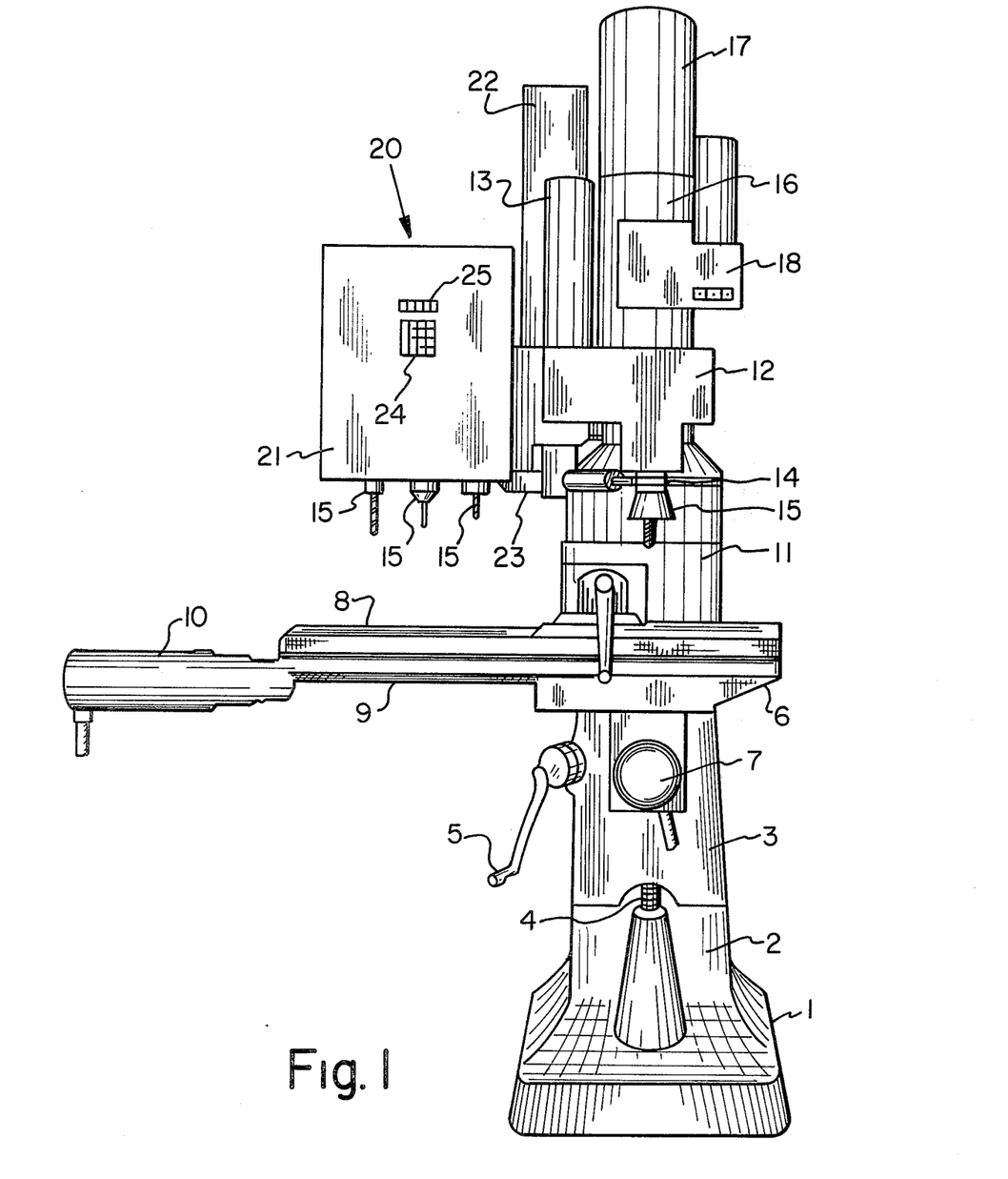
FIG. 1 is a pictorial view of a milling machine with a tool changer according to this invention mounted thereon.

Referring now to FIG. 1, there is shown a pictorial view of a milling machine with the tool changer mounted thereon. The milling machine comprises a base 1 and standard 2 which supports a platform 3 that is adjustable up and down by screw 4 turned by handle 5. Mounted upon the platform is an X-position table 6 which is mounted to be moved in and out relative to the platform by a lead screw turned by motor 7. Mounted to the X-position table is a Y-position table 8 which is movable side-to-side relative to the X-position table by lead screw 9 driven by motor 10. Secured to an upper extension 11 of the standard 2 is a power quill 12 that is driven by motor 13 to move the spindle 14 up and down. The spindle 14 is shown with tool holder 15 therein. The spindle drive motor 16 is mounted above the upper extension 11 of the standard. Mounted over the spindle drive motor 16 is the motor 17 for operating the tool draw bar; that is, the automatic means for securing and releasing a tool holder in the spindle 14. A speed changer 18 enables control of the spindle speed. To this point, what has been described is more or less standard equipment (with the exception of the speed changer) on many milling machines. The pictorial sketch (FIG. 1) is based upon the well-known Bridgeport milling machine.

This application pertains to the tool changer 20 mounted to the milling machine. The tool changer comprises a tool store 21 with attached arm frame 22 from which is supported a twin claw tool arm 23. A microprocessor controller, of which the keypad 24 and LED display 25 are shown in the pictorial, is mounted in a cabinet in the front of the tool store. Not shown in the pictorial but especially useful in combination with the milling machine and tool changer is a computer numerical control (CNC) for controlling the X and Y position tables and the Z position of the spindle as well as for commanding the particular tools and speeds to be used in a given tooling operation.

The tool changer described herein can be controlled manually or directly by the CNC. It should be appreciated from FIG. 1 that the tool store 21 and the twin claw tool arm 23 are mounted well above the X and Y position tables where they cannot interfere with the workpiece or access to the tables. Yet, all operations for setting up the tool changer are within arm's reach of an operator standing before the milling machine.

The tool changer enables the easy upgrade of a standard, vertical milling machine to machining center capability. No modification of almost any standard milling machine is required except for attachment of the mounting brackets supporting the tool store 21 from the milling machine and twin claw arm 22 from the tool store. The embodiment described herein is powered by standard electrical and air supplies available in machine shops. For different models of milling machines, the brackets (now shown in FIG. 1) differ. The main portions of the tool changer require no modification. The brackets must space the tool changing position (located in the tool store 21) and the axis of the twin claw arm 22 so that when the claws of the tool changer are extended, one grasps the tool holder in the spindle and the other grasps the holder at the tool changing position. Also, the tool store and the twin claw tool changer must be at about the same level as the spindle in its uppermost position. The length of the claw extensions can be adjusted to further facilitate adaptation to different milling machines.

The tool holders 15 always remain tool face down and thus there exists no need to provide wrist mechanisms to invert the tool holders when being transferred from the spindle 14 to the tool store 21 and vice versa. Keeping the tool holders tool face down helps maintain the cleanliness of the tools. The tool holders are the type 30 and type 40 holders commercially available with a slight modification which does not in any way effect the interface with the spindle and draw bar but does enable the hanging of the tool holders in the tool store.

Figures 2, 4:
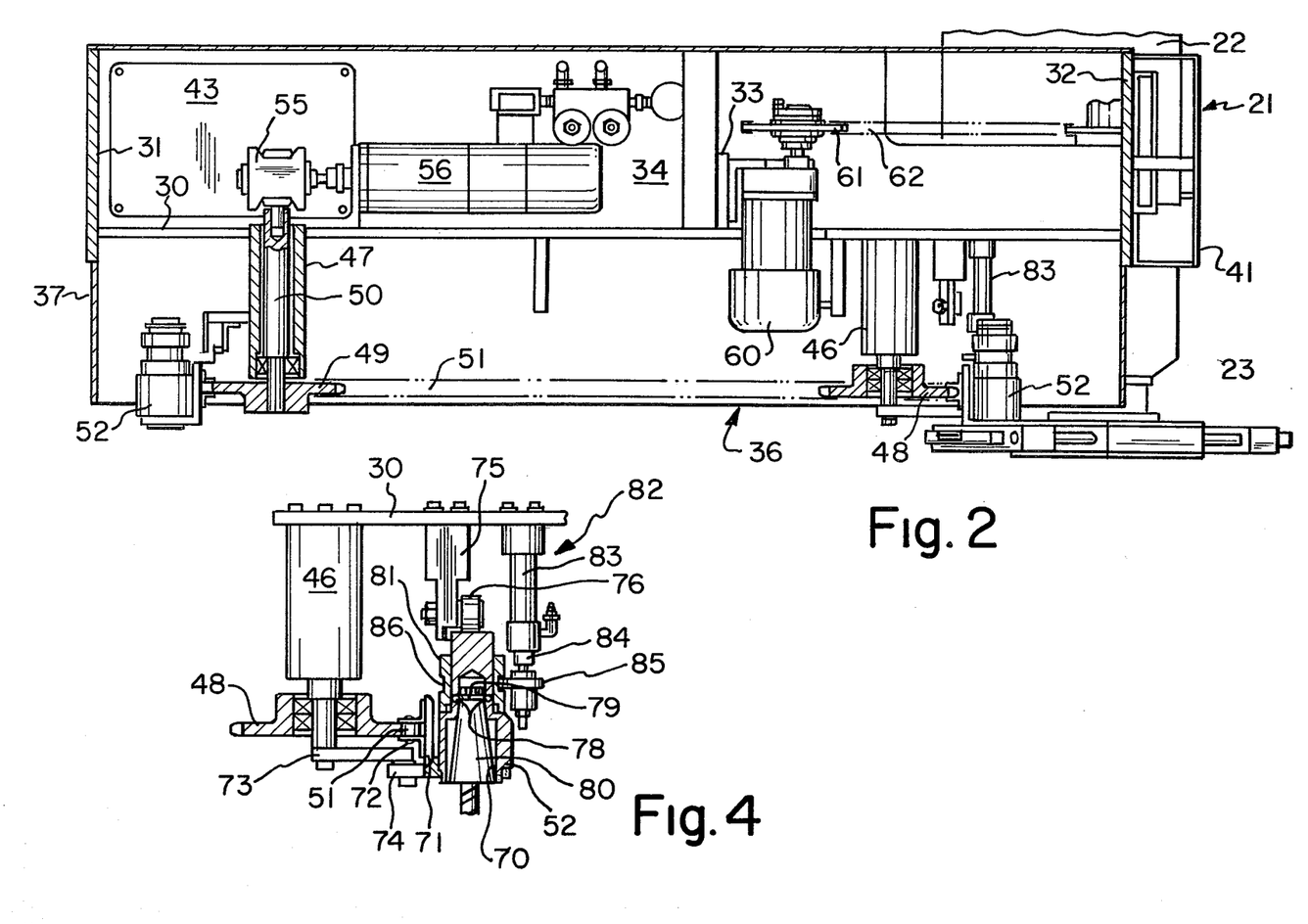
FIG. 2 is a side view in section of a tool store which is a portion of a tool changer according to this invention.
FIG. 4 is a detailed tool hanger assembly and the ready station in the tool store.
Figure 3:
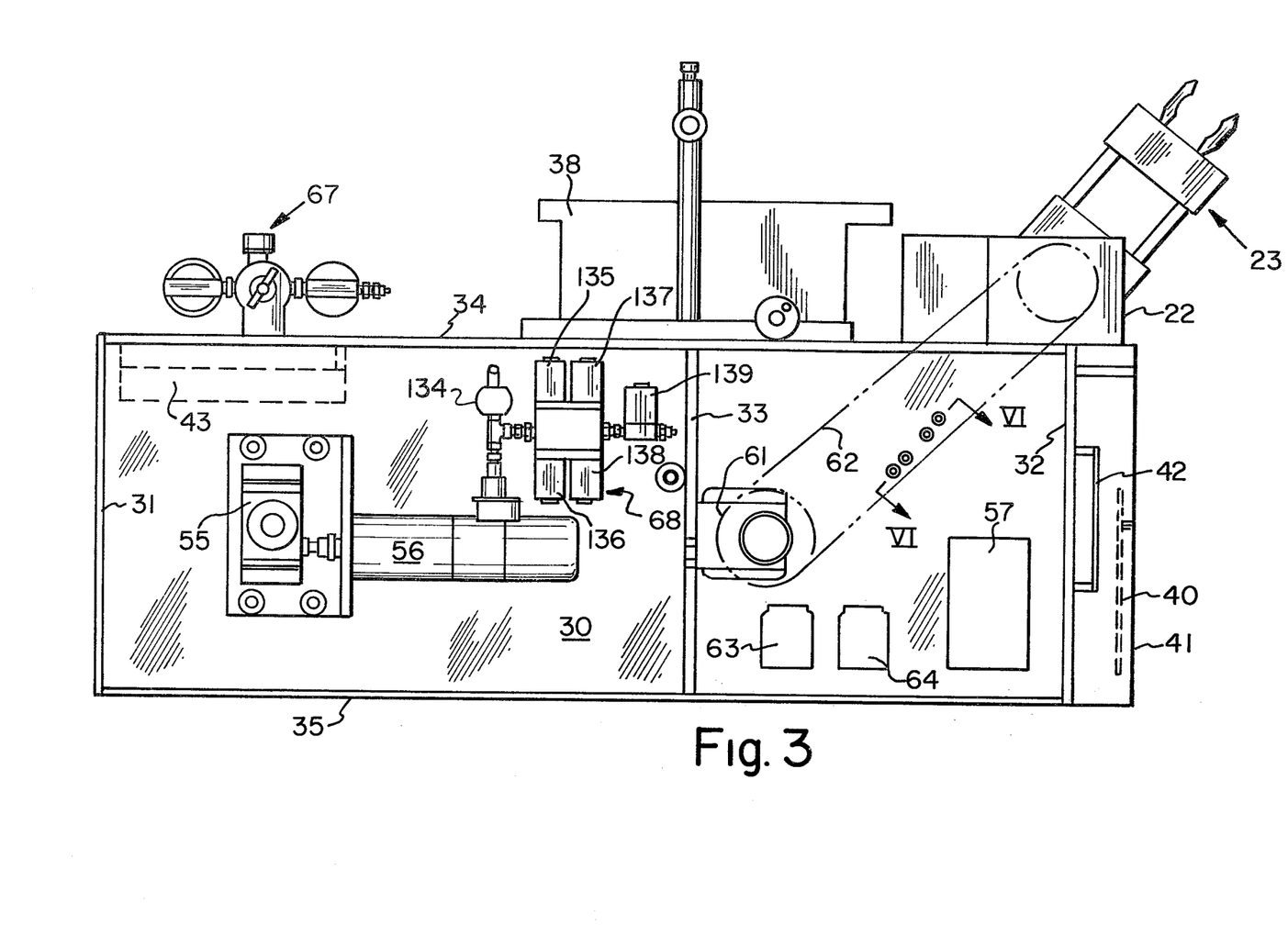
FIG. 3 is a top view of the tool store with the cover removed.

Referring now to FIGS. 2 and 3, the tool store 21 comprises a horizontal bed 30 to which most of the remaining elements of the tool store are fastened. The store has end plates 31, 32 and center web 33 and side plates 34, 35 which form a rectangular closure below which a tool carousel 36 is mounted. A protective skirt 37 extends downward below the horizontal bed 30. Mounted to side plate 34 is the arm frame 22 which supports the twin claw arm 23. The bracket 38 for securing the tool changer to the milling machine fastens to side plate 34. The microprocessor controller is held upon printed circuit boards mounted at various locations. A display and keypad board 40 is mounted on the inside of cabinet door 41 which is hinged to the endwall 32. The main logic boards 42 are mounted to the endwall 32. An a.c. power control board 43 is mounted to sidewall 34 near the rear of the tool store.

Extending downward from the horizontal bed 30 are fixed axle shaft support 46 and rear bearing housing 47. Idler sprocket 48 is mounted to a fixed axle in the fixed axle shaft support. Drive sprocket 49 is mounted on axle 50 extending downwardly through and journaled in the rear bearing housing 47. The axes of the sprockets are spaced about twenty-eight inches apart. A roller chain 51 orbits about the drive and idler sprockets. The sprockets in the embodiment being described have a diameter of about six inches. Equally spaced about the chain are tool hangers. Typically, twenty-five tool hangers equally spaced apart will be provided on the chain. The tool hanger 52 fastens to a pin-link plate of the roller chain. In FIG. 2, tool hangers are shown at the rearwardmost and forwardmost positions at the same time; which, of course, is only for illustration. With an odd number of tool hangers, at no time are hangers in both of these positions. For simplicity the remaining tool hangers are not shown.

The axle 50 is driven by d.c. servomotor 56 through gear box 55. The servomotor has an encoder marker generator on its rear shaft (not shown) to permit closed loop servo control of the chain position. In the embodiment being described, the encoder marker generator of the servomotor in one revolution outputs two hundred pulses of sine wave, inverted sine wave, cosine and inverted cosine wave. Also, once per revolution, the encoder generator outputs a pulse marker signal. In the embodiment being described, four revolutions of the servomotor (800 cycles from the encoder generator) moves the chain a distance to advance from one tool hanger to the next. The d.c. servomotor also has an integral tachometer that outputs an analog signal proportional to speed. The d.c. servomotor is controlled by a controller amplifier 57 (in this case, a linear amplifier).

Also mounted in the bed 30 is an a.c. motor 60 having an output sprocket 61. The a.c. motor rotates the twin claw arm 180 degrees between stop positions (as will be explained) by roller chain 62. The a.c. motor is controlled by two electromechanical relays 63, 64. One relay switches a.c. power to the motor and the other switches the polarity to control the motor direction.

Mounted to the outside of the side plate 34 is a typical air pressure control valve 67. Mounted to the bed is a bank of solenoid operated air valves 68 (which will be explained thereafter).

Referring now to FIG. 4, a detailed section of the tool hanger 52 is illustrated in the tool changing position. The front fixed axial shaft support 46 is shown hanging from the bed 30 with the idler sprocket 48 sectioned. The tool hanger 52 comprises a socket 70 that is carried by bracket 71 which is secured to special angle shaped pin-linked plate 72 to the roller chain. To steady the tool hanger at the tool changing position, arms 73 fastened to an extension of the fixed angle shaft support 46 positions a roller 74. The edge of the roller bears upon the lower edge of the tool hanger to withstand the force applied to the tool hanger when the claw of the claw arm is forced over the tool holder in said hanger. Extending downwardly from the bed 30 is a post 75 with a roller 76 thereon that supports the top of the tool hanger at the tool changing position to withstand the force applied when a tool holder is being inserted upward into the socket.

The tool hangers have a ball and collar arrangement wherein a number of balls 78, captive in channels are forced by the collar into a groove 79 machined into a standard tool holder 80 typically used to hold tools in a spindle. The balls also wedge against the surface machined in a collar 81 which is concentric with and part of the socket 70. With the collar moved up away from the balls, the tool holder is inserted into the socket. The balls are forced to move out of the way by the tool holder which enters the socket. The collar is dropped and the balls are forced into the space provided by the groove in the tool holder thus giving the axial support required to hold the tool holder firmly in the socket. Release is achieved by pulling up on the collar relative to the socket. The collar may be operated manually to release the tools. There is also a solenoid actuated releasing mechanism 84 which is able to lift the collar when the socket is in the tool changing position. The release mechanism 82 comprises an air cylinder 83 pendent from bed 30. A piston 84 extending downward from the air cylinder has a flanged head 85 that engages an annular slot 86 on the outside of the collar 81. When the cylinder is energized, the piston is raised raising the collar.

Figures 5, 6:
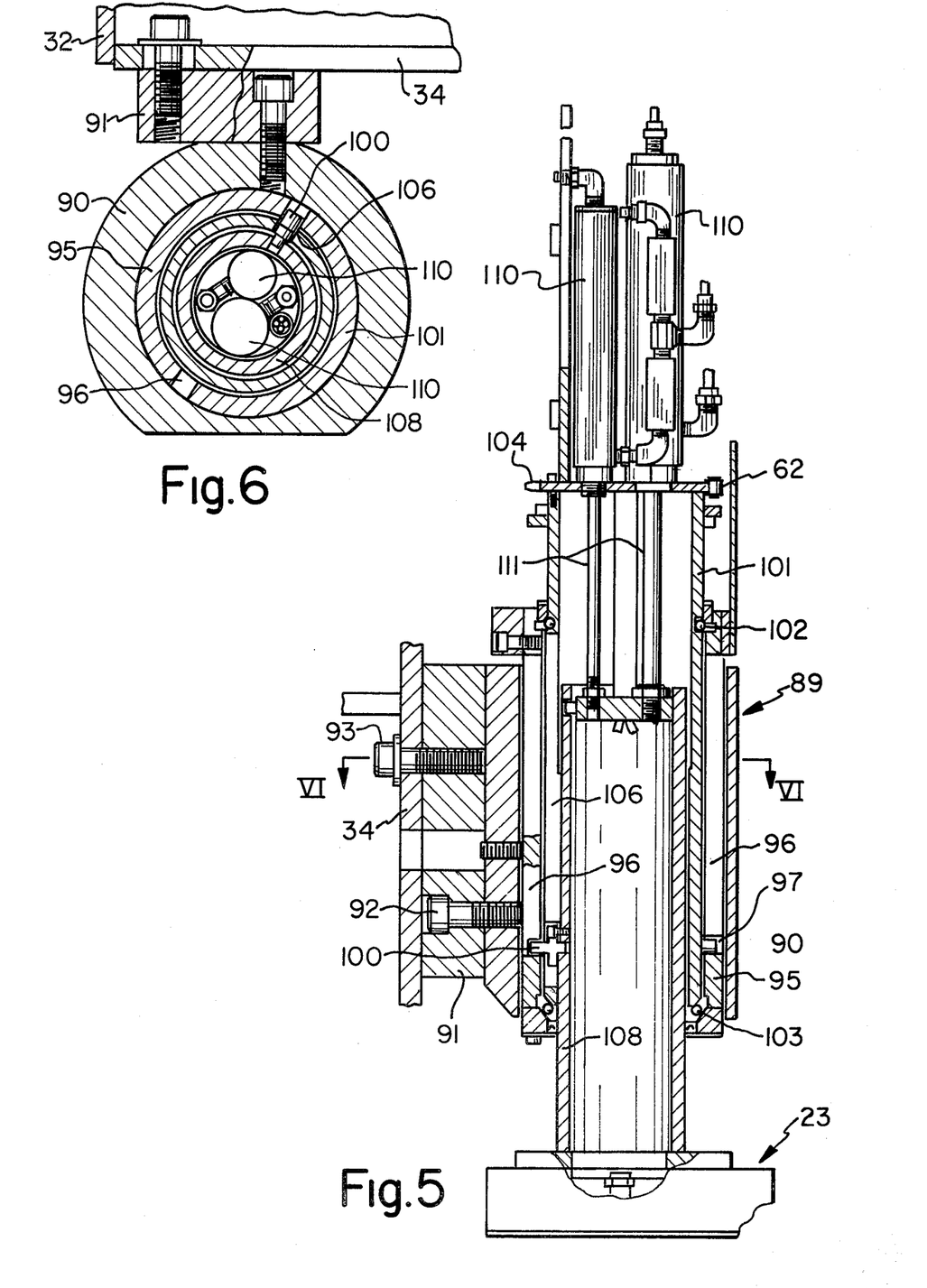
FIG. 5 is a side view in section of the sliding and rotating tubes which support the twin claw transfer arm.
FIG. 6 is a horizontal section taken along lines VI—VI on FIG. 5.

The twin claw transfer arm is supported by transfer arm support 89 which comprises four concentric tubes. Referring to FIGS. 5 and 6, support tube 90 is fixed. It is held in place by spacer block 91 and fasteners 92 and 93 against the sidewall 34 of the tool store near the frontwall. The support tube 90 comprises the foundation of the transfer arm assembly. Guide tube 95 is fixed within the support tube 91 held fixed relative to the support tube by threaded plugs. The guide tube has two guideways or grooves 96 that run the substantial entire axial length thereof. The slots are on opposite sides of the tube, i.e., 180 degrees apart. A semi-circular guideway 97 joins the axial guideways 96 at the lower ends thereof. Thus a guide pin 100 can move down one axial guideway, 180 degrees around the semi-circular guideway, and up the other axial guideway. The pin passing through the guideways restricts the possible movement of the transfer arm. The function of the guide pin is further described hereafter.

Rotatably secured concentric within support tube and guide tube is a drive tube 101. The drive tube 101 is secured for rotation by upper thrust bearing 102 and lower thrust bearing 103. The thrust bearings prevent axial movement of the drive tube 101. A sprocket 104 is secured to the upper axial end of the drive tube so that it can be driven via a roller chain 62 by the a.c. motor 60 mounted in the tool store. The drive tube 101 has an axial slot 106 therein. The function of this slot will be described below with reference to guide pin 100.

Slide tube 108 telescopes with the drive tube 101. At the lower end of the slide tube is mounted the twin claw arm 23. Mounted for 180 degrees rotation integral with the drive tubes are air cylinders 110. The pistons 111 of the cylinders 110 extend down and are secured at their lower end to the slide tube 108. These actuate the slide tube 108 to the upper (tool changing) position or down (the rotate) position. Pin 100 is secured to the slide tube. The pin rides within the slot 106 in the drive tube 101. Thus when the drive tube 101 is rotated, so is the slide tube 108 and no substantial twist is placed on the pistons 111.

Also fixed to and extending from the slide tube is a guide pin 100 which extends through the guide slot 106 into the guideways 96 and 97 in the guide tube. Thus, there exist only two angular positions (180 degrees apart) where the slide tube 108 can be moved up and down and only one axial position where it can be rotated and then only through 180 degrees.

Limit switches (not shown) are positioned to detect and generate electrical signals when the slide tube is full up or full down and when the drive tube is rotated full clockwise and full counterclockwise.

Figure 7:
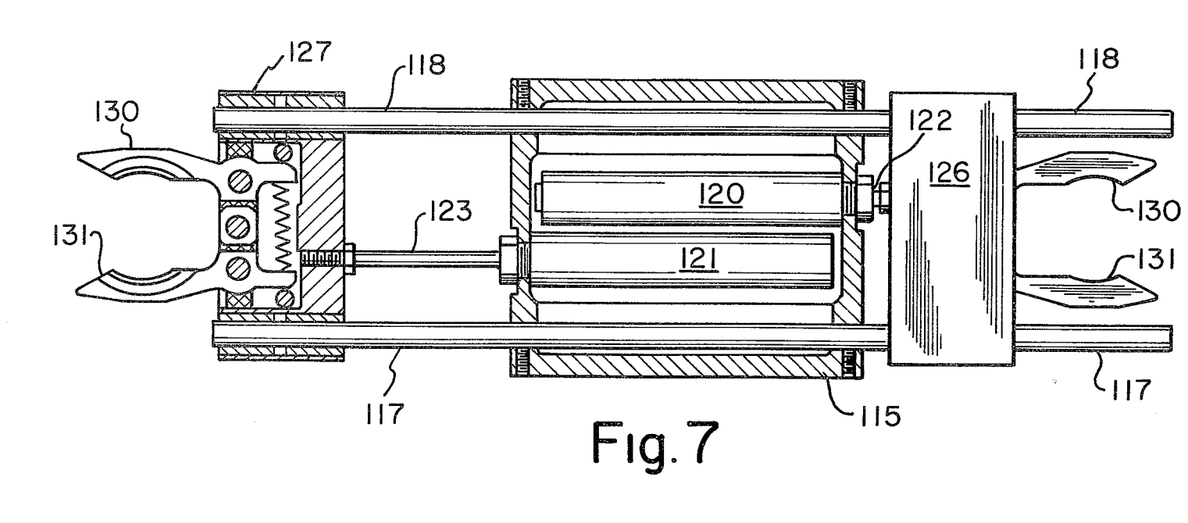
FIGS. 7 and 8 are detailed sections of the twin claw transfer arm.
Figure 8:
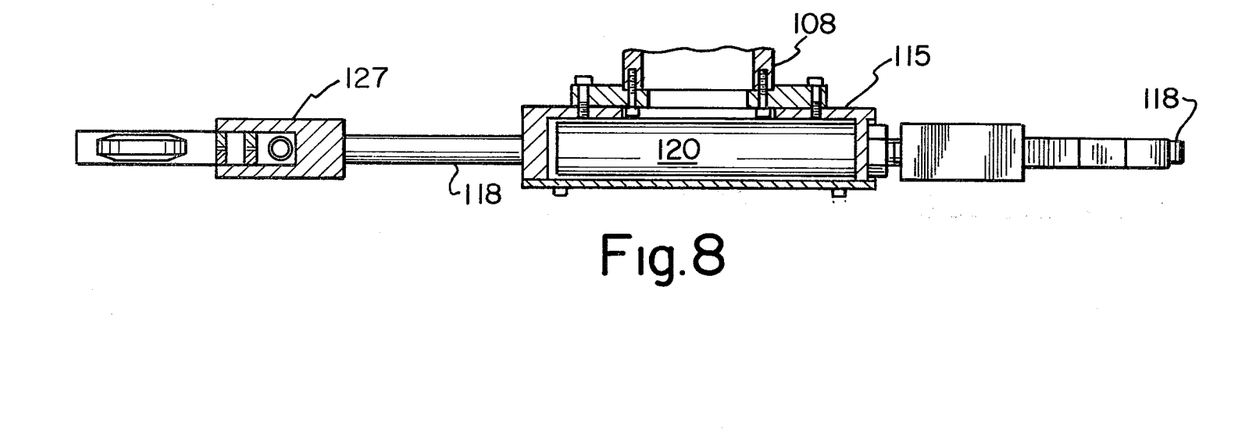

Referring now to FIGS. 7 and 8, the twin claw mechanism 23 is shown in more detail. Fastened to the bottom of the slide tube 108 is an arm base 115. Within the arm base 115 are secured two parallel guide rods 117, 118. The guide rods extend to each side of the arm base 115. Two air cylinders 120, 121 have pistons 122, 123 extending in opposite directions. Slidable on the rods 116, 117 ae claw supports 126, 127 which are positionable in and out by the cylinders and pistons. Two fingers 130, 131 mounted in the claw supports are spring biased toward each other for grasping a tool holder and restraining its vertical movement when it is released from the tool holder or spindle. When the tool holders are secured in either the spindle of the milling machine or the tool hanger, the claw can be withdrawn from the holders. The fingers 130, 131 open against the spring bias to release the tool holder.

Referring back to FIG. 3, the bank of solenoid controlled pneumatic air valves 68 can now be explained. Valve 134 is the main solenoid control valve that applies air to all five air cylinders in the system. Valve 135 energizes the cylinder that draws the slide tube to the upper or spindle position. Valve 136 energizes the cylinder that pushes the slide tube to the down or rotate position. Valve 137 energizes the cylinders 120, 121 to withdraw the claw supports into the claw arm 23. Valve 138 energizes the cylinders 120, 124 to extend the claw arms. Valve 139 energizes the air cylinder 83 to release a tool holder from a tool hanger at the tool changing position.

Figure 9:
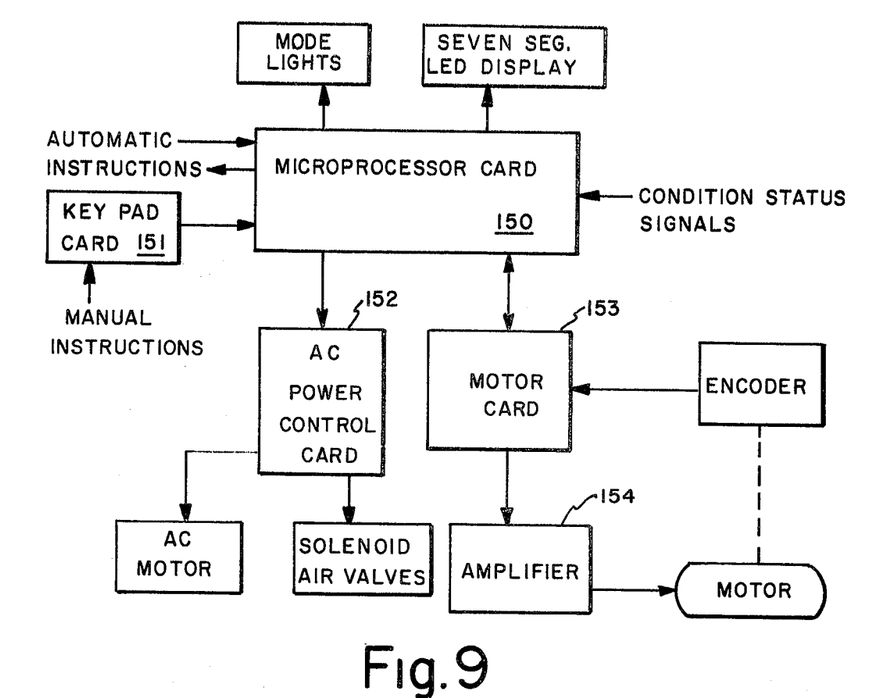
FIG. 9 is an electrical schematic showing the relationship of a microprocessor controller to the remainder of the system.

FIG. 9 is a schematic of the electronic control system for the tool changer. Central to the control system is the microprocessor card 150. It receives manual instructions through the keypad card 151 and automatic signals (from the CNC). An "operation complete" output is available to the source of the automatic instructions. The microprocessor board directly drives three mode indicator LED's (manual mode, automatic mode, test mode) and a two digit seven segment LED display. On entry and/or execution of a command, it is displayed upon the seven segment display whether or not the command is entered manually or automatically. The microprocessor board directly receives numerous system conditions status signals (to be described). The microprocessor board outputs commands to various system components. Those requiring an a.c. signal are passed to a.c. power control board 152. Stepping instructions are issued to the motor (serial load) card 153. The motor card issues motion commands to the linear amplifier 154 which drives the motor.

Figure 10:
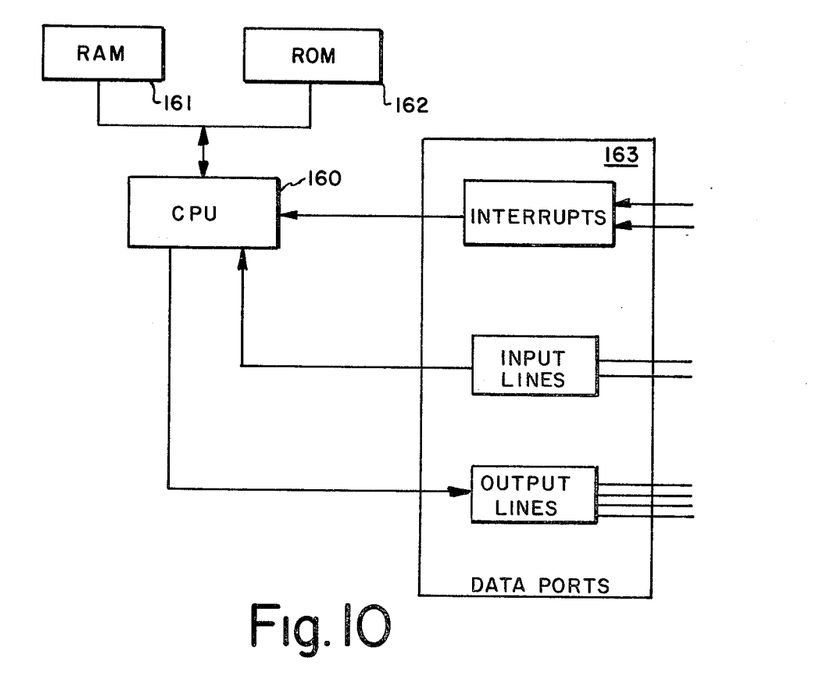
FIG. 10 is a schematic of the microprocessor controller.

FIG. 10 schematically illustrates the microprocessor card. The basic elements in the card are a CPU chip 160 (for example, the Motorola 6802), RAM chips 161, ROM chips 162 and Programmable Interface chips 163 (for example, Motorola 6821 chips), address bus, data bus, control bus and sundry other chips. The ROM chips store the control procedures.

The microprocessor board receives a plurality of input signals that are polled to determine status and several inputs that issue interrupt signals to get the attention of the microprocessor. The microprocessor issues a plurality of output signals. The input signals comprise three types, manual instructions input by the keypad, automatic instructions received from the CNC and signals indicative of the physical condition of the apparatus derived, for example, from limit switches. The keypad inputs signals to one data port assigned for that purpose. Another data port is assigned to receive the automatic instructions provided by the CNC. Because individual data lines within a programmable port can be assigned for either input or output, the grouping of signals transferred through ports is somewhat arbitrary. For programming convenience, it is desirable to keep all data lines on a port for either input or output. The signals for driving the seven segment LED display are all output through the same port. Table I below lists the polled input signals to the microprocessor board for a preferred embodiment.

TABLE I

| Polled Inputs | |
|---|---|
| Keypad Instructions 8 data lines | Manual input |
| Automatic Instructions 7 data lines BCD | from CNC |
| Z Axis Of Spindle In Tool Change Position | (limit switch) |
| Carousel At Home Position | (limit switch) |
| Arm In Rotate Position (down) | (limit switch) |
| Arm In Spindle Position (up) | (limit switch) |
| Arm Full CW or CCW | (limit switch) |
| Air Pressure OK | (pressure switch) |
| Step Counter Zeroed | (from motor control board) |

Table II describes the interrupt inputs to the microprocessor card.

TABLE II—Interrupt Inputs

Air Pressure Not OK
Data Available Strobe (From CNC)
Reset

Table III describes the outputs from the microprocessor card.

TABLE III—Outputs

Figure 11:
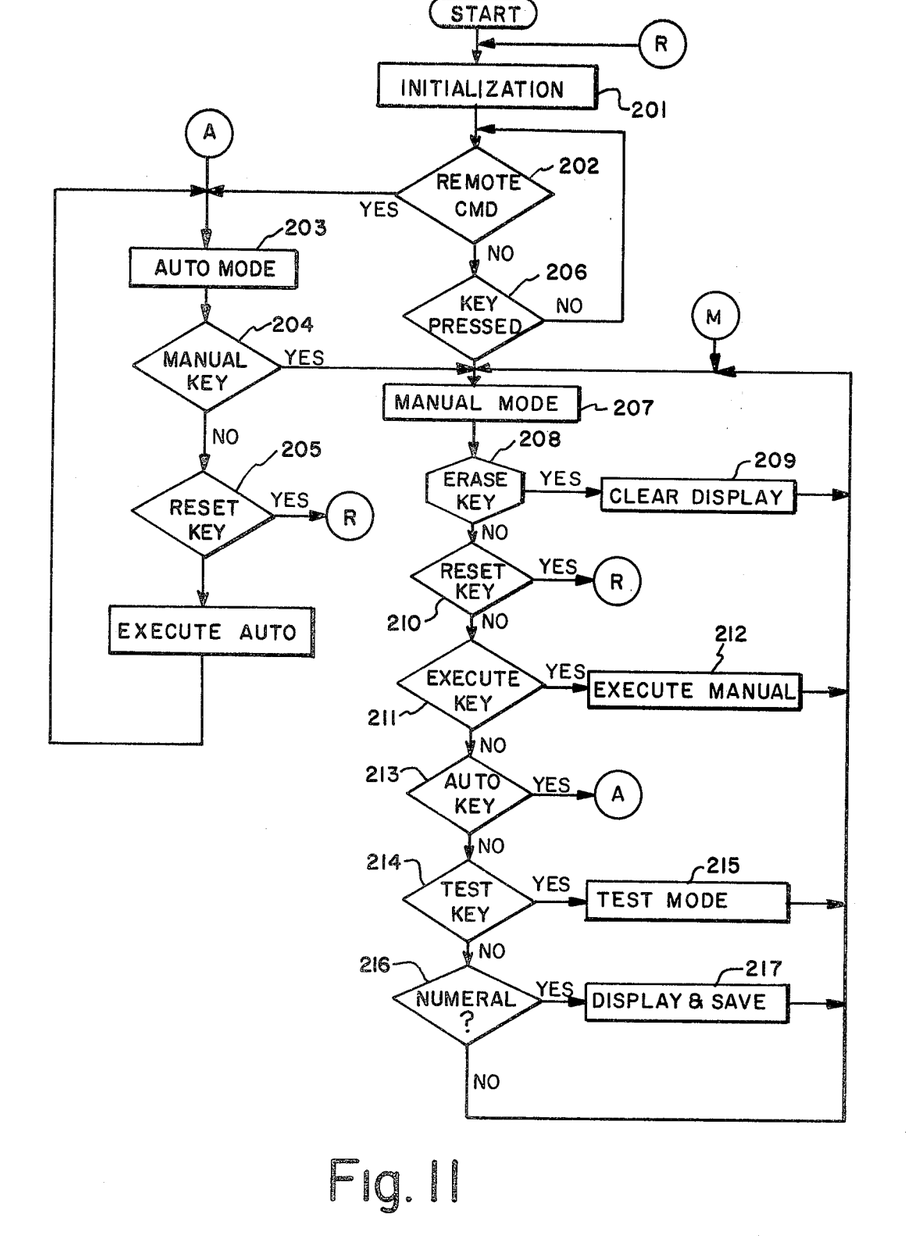
FIG. 11 is a flow diagram illustrating the general procedures stored in ROM.

Seven Segment LED Display (8 data lines—1 output strobe)
Mode LED's (3)—three data lines
Tool Changer Controls (to AC power supply board):
  Spindle Off
  Impact Wrench up/down
  Impact Wrench CW/CCW
  Impact Wrench on/off
  Release Tool Holder From Carousel Tool Hanger
Transfer Arm Controls (to AC power supply board):
  Expand/withdraw Claws (to sol 5 & 6)
  Arm Motor CW/CCW
  Arm Motor on/off
  Arm To Spindle Position (up) (to sol 1)
  Arm To Rotate Position (down) (to sol 2)
Outputs To Control Carousel Transfer Motor (to motor control board):
  clock
  Reset Counter
  Direction FIG. 11 is a flow chart which illustrates the basic operation of the tracer control and the procedure stored in the ROM chips in the CPU board. After initialization at 201, a test is conducted at 202 for the presence of a remote command at the port that receives remore BCD commands from the CNC. If a remote command is present, the system enters the automatic mode at 203 and the automatic mode LED is lit. Within the automatic mode, a test for entries at the keypad to return the system to the manual modes or to reset the system, is made at 204 or 205 respectively.

Figure 12:
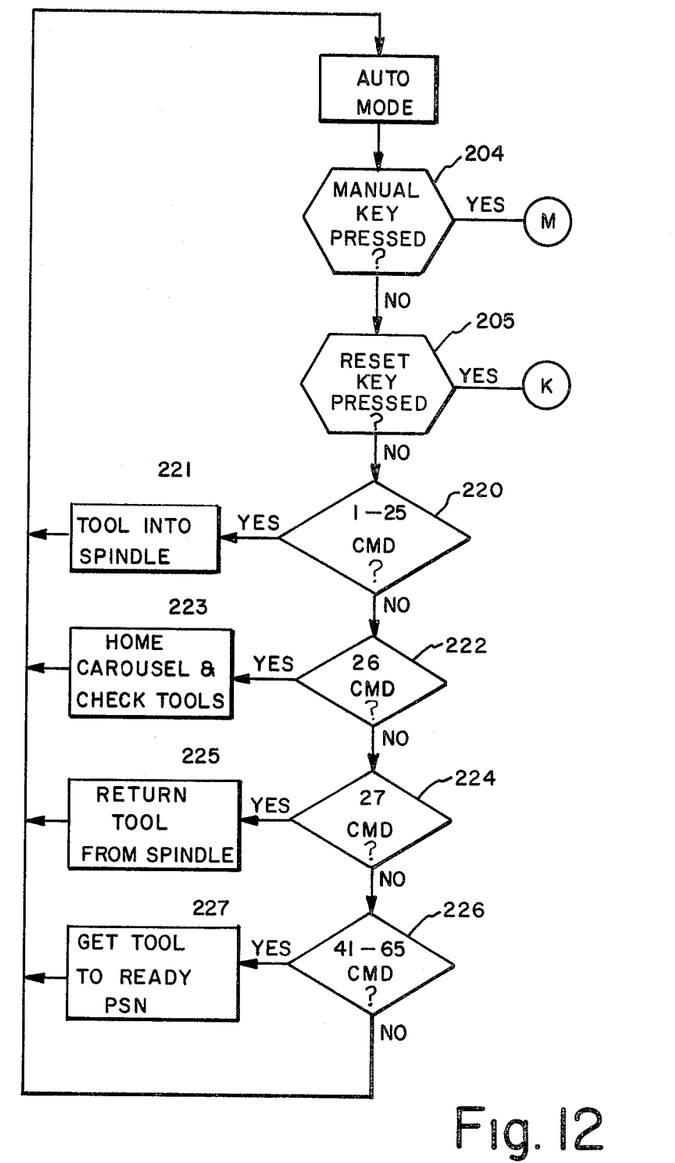
FIG. 12 is a flow diagram illustrating the procedures stored in ROM for the automatic mode.

Execution of the automatic commands depends upon the typed command (See FIG. 12 for an expanded explanation of the automatic mode). Upon completion of one automatic command, the system waits for another.

If after start-up, an automatic command is not present (test at 202), the CPU tests for a keypad entry at 206 and loops until either a keypad entry or remote command is present.

When a keypad entry is made, the manual mode is entered at 207, the manual mode LED is lit and the type of keypad entry tested. A positive test for an erase entry at 208 can result in a clearing of the two-digit, seven-segment display at 209. A positive test for a reset key at 210 results in return to the initialization procedure at 201. A positive test for an execute key at 211 causes the numerical command previously entered to be executed at 212. A positive test automatic key at 213 causes return to the automatic mode at 203. A positive test for the test mode key at 214 causes entry into a test mode at 215. A positive test for a numerical entry at 216 causes the numeral to be saved and displayed at 217. One or two successive numerals define a manual command which is executed upon the pressing of the execute key. The manual mode numerical commands are one or two digit BCD numbers that have the same meaning as the one or two digit BCD automatic mode commands.

FIG. 12 is a more detailed flow diagram describing operation during the automatic mode and the relevant parts of the procedures stored in the ROM chips. The exit tests at 204 and 205 were described with reference to FIG. 11. A test for commands "1" to "25" to 220, if positive, calls a procedure at 221 for installing in the spindle one tool numbered "1" to "25" corresponding to the command. If a tool holder is already in the spindle, it is replaced in the carousel. A positive test for command "26" at 222 calls a procedure at 223 to initialize the carousel. The carousel is moved to the home position. The arm is moved to the up position. At this time the look-up table is initialized such that the tool holder in the first hanger is assigned as the number "1" tool, etc., and thereafter the command "1" will bring that tool holder to the spindle although it will not be returned again to the first hanger except by chance. A positive test for command "27" at 224 calls for a procedure at 225 for returning all tools to the carousel. A positive test for commands "41" to "65" at 226 calls a procedure at 227 to advance the tool whose number is 40 less than the command to the ready position. In this way, while one tool is in use in the spindle and being used, the carousel can be advancing the next tool to be used to the ready position. After start-up, there does not exist a fixed relation between the tool hangers on the carousel and tool holders initially residing therein. Tools taken from the spindle are placed into whatever tool hanger is then at the ready position. The controller remembers the new tool holder-tool hanger position in the look-up table in its RAM. Hence, there exists no need to move the carousel while following the removal of a tool from the spindle and before returning it to a tool hanger.

Figure 13:
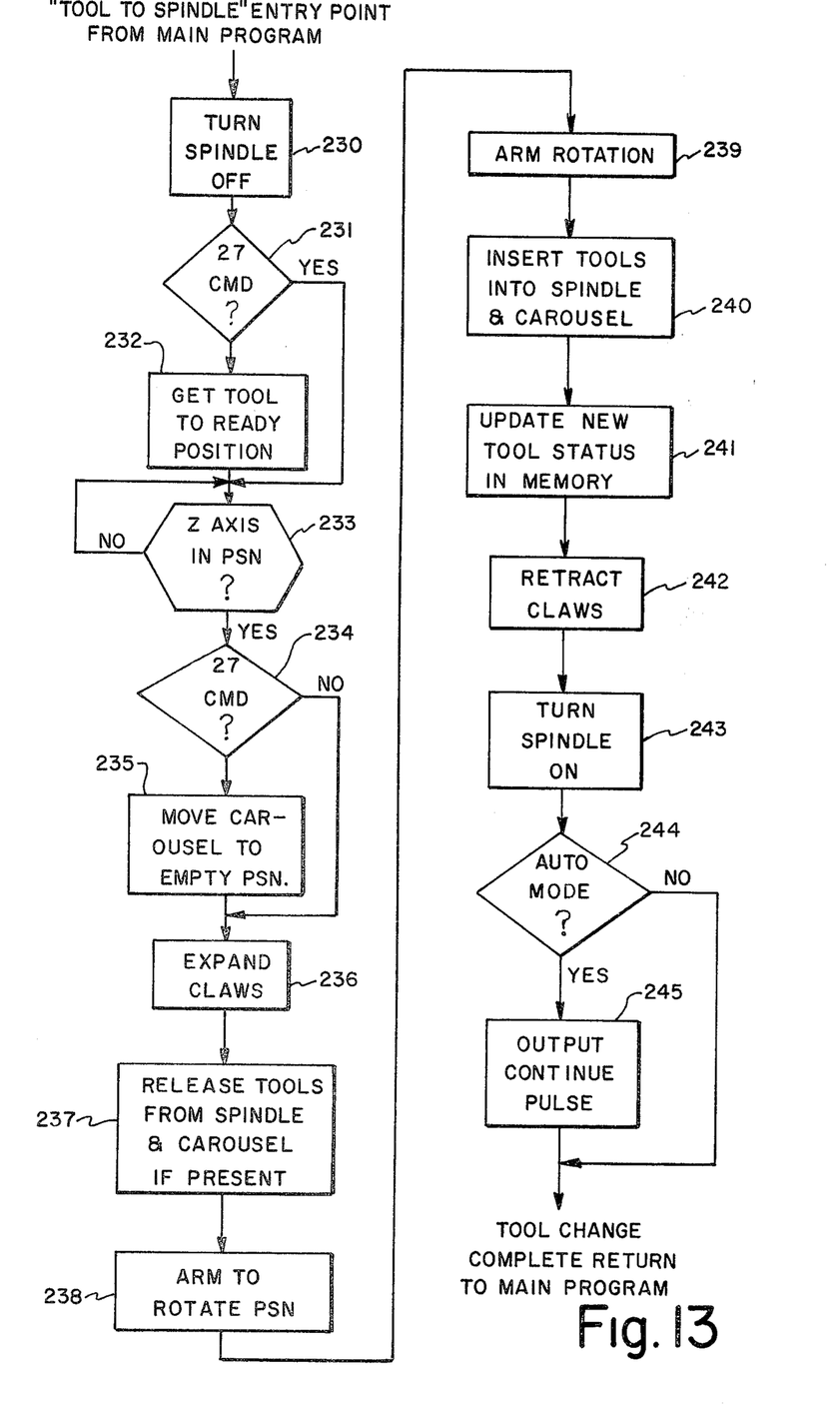
FIG. 13 is a flow diagram illustrating the procedure stored in ROM for changing tool holders.

FIG. 13 illustrates in more detail the operation for moving a tool from spindle to carousel (either commands "1" to "25" or "27") and the relevant procedure stored in ROM. A command to turn off the spindle is outputted at 230. The digital output at the microprocessor board opens a mechanical relay switch on the a.c. board to cause circuitry associated with the milling machine to interrupt rotation of the spindle and return it to its uppermost vertical position. A positive test at 231 for the "27" command steps past the procedure at 232 for getting the tool in the ready position. This procedure will be explained with reference to FIG. 14. The procedure now loops at 233 until the spindle is at its zero axis position as detected by limit switches mounted to the milling machine. When the test for Z axis position is positive, control passes to a test for command "27" at 234 to determine if the procedure at 235 can be bypassed. If a "27" commands is in process, then the procedure at 235 is to move the carousel to place an empty tool hanger at the ready position. At this time due to procedure at 236, the claws in the transfer arm expanded by a digital signal output from the microprocessor card, converted to an a.c. signal on the a.c. power board, actuating solenoid valves 137, 138 to apply air to air pistons 120, 121. The claws then grasp the tool holders, one in the spindle and one in the hanger on the carousel at the ready position.

The next procedure at 237 is to release the tools from the tool hanger and carousel. The tool is released from the spindle by the correct sequence of digital signals from the microprocessor board to the a.c. power board. The a.c. board outputs an a.c. signal to lower the impact wrench and makes two relay connections, one that determines the direction of the impact wrench and the other that turns the impact wrench on. The tool holder in the hanger is released by a digital signal from the microprocessor board to the a.c. power board that outputs an a.c. signal that actuates solenoid air valve 139 to actuate piston 83 (See FIG. 4).

The next procedure at 238 is to lower the arm to the rotate position. This is achieved by a digital output from the microprocessor board to the a.c. power board which outputs an a.c. signal to actuate solenoids 135, 136 to control high pressure air to cylinders 110, 111. A limit switch senses that the lower position has been reached and inputs that status to the microprocessor board.

The arm is then rotated (procedure at 239). The rotation is caused by two digital outputs from the microprocessor board to the a.c. power board. One actuates relay 63 to establish the rotational direction of the a.c. motor and the other actuates relay 64 that energizes the a.c. motor. The rotation is until stops are reached and the end of rotation (180 degrees) is sensed by limit switches that input the status to the microprocessor board.

Procedure 240 comprises inserting the tools in the spindle and carousel. The process is substantially reverse of procedures 238 and 237. Procedure 241 comprises undating the tool status in the look-up table in RAM memory. Procedure 242 comprises retracting the claws and is substantially the reverse of procedure 236. The spindle is turned on at 243. A positive test for the automatic mode results in calling procedure 245 that outputs a pulse from the microprocessor board to the CNC to indicate that the tool change is complete.

Figure 14:
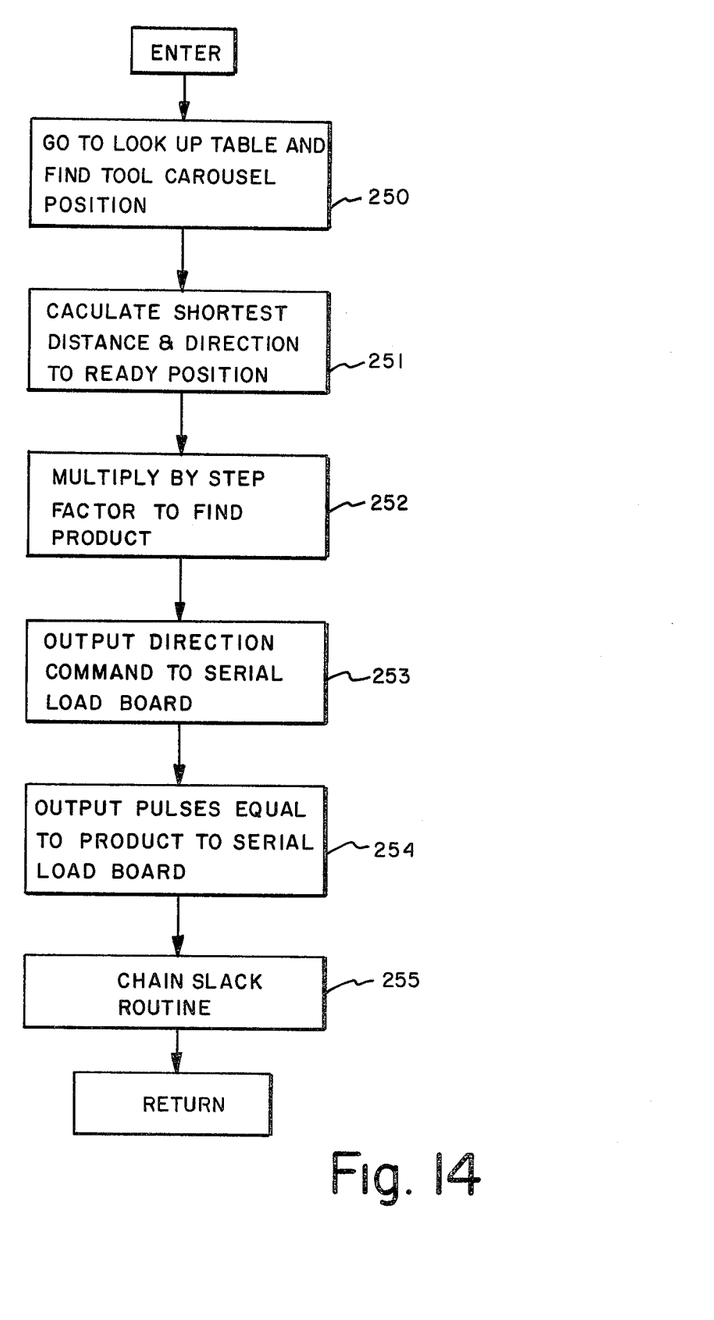
FIG. 14 is a flow diagram of the procedures stored in ROM for bringing a desired tool holder to the ready position in the tool store.

Referring to FIG. 14, the procedure for bringing a tool holder to the ready position is described. The procedure may be entered from a manual or automatic command "1" to "25" to bring the tool corresponding to the command to the ready position, i.e., command "20" will bring to the ready position the tool which was initially designated "20". The procedure may also be entered in response to commands "41" to "65" in which case command "60" will bring tool "20" to the ready position but it will not be exchanged until a command "20" is received. By use of the "41" to "65" series commands, the next tool required in the spindle can be brought to the ready position while the present tool is still at work in the spindle saving additional seconds during tool exchange. The CNC must be programmed to issue to these anticipatory instructions to take advantage of this feature.

At initialization, each tool holder is assigned a number "1" to "25" and is placed in a tool hanger on the carousel in a preestablished sequence starting with a "home " hanger and proceeding either clockwise or counterclockwise around the carousel chain. After the second tool is placed in the spindle, the initial sequence is no longer maintained as the number "1" tool holder is now in the number "2" hanger. With each exchange, the new ordering is less similar to the initial ordering. Moreover, after the first tool is installed while the ordering relative to the home hanger is the same, the ordering relative to the ready position is different. The microprocessor controller has sufficient "scratch pad" memory to keep track of the location of the tool hangers relative to the ready position (or the home position which may or may not be different) and to keep track of which tool holder is in which tool hanger.

The initial action of the procedure for bringing a tool holder to the ready position is a procedure at 250 for going to a look-up table in scratch pad memory to find the desired tools' carousel position. Then in a procedure at 251 the shortest distance and direction to the ready position is calculated in terms of number of tool positions. Next the distance in tool positions is converted at 252 to the number of stepping motor steps required. In the specific embodiment being described, 800 steps are required to advance one tool hanger position on the carousel and procedure 252 is a multiplication by 800. The microprocessor board then outputs a direction command and the number pulses corresponding to the number of required steps to the serial load board at procedures 253 and 254. The microprocessor can output the pulses many times faster than the serial load board or stepper motor can handle them. Thus a pulse spacing routine is required as part of procedure 254. Since all chains have a finite amount of slack, to always have the slack in the same position relative to the ready position (and thus to always place the tool hangers precisely at the ready position) it is necessary to always make the final approach to the ready position from the same direction. Hence, for example, if the carousel chain is orbited clockwise to the ready position, it simply moves to it in one continuous motion. If, however, for example, the carousel chain is orbited counterclockwise to the ready position, it is moved an extra 50 steps and then reversed for 50 steps. The chain slack routine is a procedure at 255.

Having thus described the invention with the detail and particularity required by the Patent Laws, what is desired protected by Letters Patent is set forth in the following claims.

We claim:

1. A tool changer for a milling machine or the like having a spindle for receiving a tool holder comprising:
    a tool store, said tool store comprising an orbiting chain having spaced tool hangers thereon for receiving tool holders, a ready position along the chain at which tool holders may be secured or released from the tool hangers, said tool store mounted to said milling machine.
    a twin claw arm, said twin claw arm movable on an up/down axis, rotatable through 180 degrees and having two claws expandable and retractable along a radial axis, said arm mounted relative to said tool store such that in the expanded position, the claws may engage tool holders at both the ready position of the tool store and in the spindle of the milling machine,
    means for storing a designation of which tool holder is in which tool hanger and which tool is in the spindle.
    means for receiving instructions designating a tool holder for moving said designated tool holder to the spindle,
    means for positioning the orbiting chain to bring a desired tool hanger to the ready position,
    means for activating the twin claw arm through its described motions,
    means responsive to said instructions for developing command signals to the means for positioning the orbiting chain and means for activating the twin claw arm to exchange the designated tool holder with the tool holder in the spindle of the milling machine.

2. A tool changer for a milling machine or the like having a spindle for receiving a tool holder and an automatic power drawbar for engaging and releasing a tool holder comprising:
    a tool store, said tool store comprising an orbiting chain having spaced tool hangers thereon for receiving tool holders, a ready position along the chain at which tool holders may be secured or released from the tool hangers, means at said ready position for releasing tool holders from tool hangers, said tool store mounted to said milling machine,
    a twin claw arm, said twin claw arm movable on an up/down axis, rotatable through 180 degrees and having two claws expandable and retractable along a radial axis, said arm mounted relative to said tool store such that in the expanded position, the claws may engage tool holders at both the ready position of the tool store and in the spindle of the milling machine,
    means for storing a designation of which tool holder is in which tool hanger and which tool is in the spindle,
    means for receiving instructions designating a tool holder for moving said designated tool holder to the spindle,
    means for positioning the orbiting chain to bring a desired tool hanger to the ready position,
    means for activating the twin claw arm through its described motions,
    means for developing status signals indicative of the position of the twin claw arm and movement of the orbiting chain,
    means response to said instructions and the status signals for developing command signals to the means for positioning the orbiting chain, means for activating the twin claw arm, the releasing means and automatic power drawbar to exchange the designated tool holder with the tool holder in the spindle of the milling machine.

3. A tool changer for a milling machine or the like having a spindle for receiving a tool holder and an automatic power drawbar for engaging and releasing a tool holder comprising:
    a tool store, said tool store comprising an orbiting chain having spaced tool hangers thereon for receiving tool holders, a ready position along the chain at which tool holders may be secured or released from the tool hangers, means at said ready position for releasing tool holders from tool hangers, said tool store mounted to said milling machine,
    a twin claw arm, said twin claw arm movable by expandable means on an up/down axis, rotatable by a motor through 180 degrees and having two claws expandable and retractable by expandable means along a radial axis, said arm mounted relative to said tool store such that in the expanded position, the claws may engage tool holders at both the ready position of the tool store and in the spindle of the milling machine,
    a microprocessor including RAM memory and procedures stored in ROM memory,
    means within said microprocessor for storing a designation of which tool holder is in which tool hanger and which tool is in the spindle,
    means within said microprocessor for receiving instructions designating a tool holder for moving said designated tool holder to the spindle, means comprising a motor for positioning the orbiting chain to bring a desired tool hanger to the ready position, means for developing status signals indicative of the position of extreme positions of the twin claw arm and the movement of the orbiting chain, means within said microprocessor responsive to said instructions and the status signals for developing command signals to the means for the motor, the expandable means and motor associated with the twin claw arm, the releasing means and the automatic power drawbar, the designated tool holder with the tool holder in the spindle of the milling machine.

4. The tool changer according to claims 1, 2, or 3 further comprising means for receiving instructions designating a tool holder for bringing the hanger holding the designated tool holder to the ready position without exchanging the tool holder with the tool in the spindle.

5. The tool changer according to claims 1, 2, or 3 further comprising means for receiving an instruction for returning the tool in the spindle to an empty tool hanger in the carousel.

6. The tool changer according to claims 1, 2, or 3 further comprising a display means for displaying the instruction being implemented during the period of implementation.

7. The tool changer according to claim 3 wherein the expandable means comprise air pistons, the motor is a direct current electrical motor and the motor associated with the twin claw arm is an alternating current electrical motor.

8. The tool changer according to claims 1, 2, or 3 wherein the means for receiving instructions comprises a keypad for inputting manual instructions and/or a port for receiving automatic instructions from a CNC or the like.

9. The tool changer according to claims 1, 2, or 3 further comprising means for generating an instruction complete signal upon completion of action based upon an instruction.

10. The tool changer according to claims 2 or 3 wherein the tool hangers are equally spaced along the orbiting chain and an equal number of steps by the motor advances the next tool hanger to the ready position.

11. In combination with the milling machine having a spindle for receiving a tool holder a twin claw arm for changing tool holders between a spindle and a tool hanger comprising a first tube for supporting the remaining structure, a second tube fixed within the first tube having two axial slots therein 180 degrees apart and a semi-circular slot joining the ends of the axial slots, a third tube journaled within the first and second tubes for rotation, said third tube having an elongate axial opening therein, a fourth tube telescoped within the third tube for relative axial movement, a pin fixed to the fourth tube extending through the elongate axial opening in the third tube and extending into one of said slots in the second tube, a twin claw arm attached to one end of the fourth tube, whereby the twin claw arm is guided in its axial and rotational movement by the pin moving within the slots.

12. In the combination of claim 11 the third tube having a toothed wheel fixed thereto for enabling the third and fourth tubes to be driven in either direction through 180 degrees.

13. In the combination of claims 11 or 12 an expandable means positioned between the third and fourth tubes to provide for relative axial movement thereof.

14. In the combination according to claims 11, or 12 said arm having two claws slidably mounted for radial movement and expandable means to provide for said radial movement.

15. In the combination according to claim 14 said claws being spring actuated to grasp a tool holder overwhich it has been forced to restrain the vertical movement of the tool holder.

16. In the combination according to claims 11, or 12 means for developing status signals indicative of when the twin claw arm is in its extreme up and down positions and in its extreme clockwise and counterclockwise positions.

17. In the combination according to claim 16 means responsive to said status signals for actuating the movement of the arm.

18. A tool store for a milling machine or the like comprising:

a platform for supporting the remaining structure, an idler sprocket and a space driven sprocket rotatably fixed to said platform, an orbiting chain upon said sprocket supporting a plurality of equally spaced tool hangers, a motor and associated encoder marker generator for activating the drive sprocket to permit closed loop servo control of the chain position, means for releasing tool holders from said tool hangers at a ready position, said releasing means fixed to said platform and being free of stops to position or hold the tool hangers relative to the direction of the chain, and means for commanding the motor to orbit the chain to bring the desired tool hanger to the ready position said commanding means comprising a microprocessor including stored procedures for orbiting the chain in the direction of the shortest possible distance to bring the desired tool hanger to the ready position and bring the chain to rest at the desired location by always making a short final approach from the same direction.

* * * * *

UNITED STATES PATENT AND TRADEMARK OFFICE
CERTIFICATE OF CORRECTION

PATENT NO. : 4,426,763
DATED : January 24, 1984
INVENTOR(S) : Emery Hornok et al.

It is certified that error appears in the above-identified patent and that said Letters Patent are hereby corrected as shown below:

Column 2 Line 43 "are" should read --arm--.

Column 3 Line 24 "it" should read --its--.

Column 3 Line 33 "springs" should read --spring--.

Column 3 Line 39 Delete --the-- (first occurrence).

Column 3 Line 68 "prgrammed" should read --programmed--.

Column 7 Line 16 Delete --the-- (second occurrence).

Column 8 Line 53 "ae" should read --are--.

Column 10 Line 36 "remore" should read --remote--.

Column 11 Line 52 "commands" should read --command--.

Claim 3 - Column 14 Line 64 Delete --the--.

Signed and Sealed this

Twenty-fourth Day of April 1984

[SEAL]

Attest:

GERALD J. MOSSINGHOFF

*Attesting Officer*     *Commissioner of Patents and Trademarks*